(12) United States Patent
Contreras et al.

(10) Patent No.: US 12,140,485 B2
(45) Date of Patent: Nov. 12, 2024

(54) ALTERNATING-BIAS SIGNAL RESISTANCE DETECTION FOR RESISTIVE TEMPERATURE DETECTORS IN DISK DRIVES

(71) Applicant: Western Digital Technologies, Inc., San Jose, CA (US)

(72) Inventors: John T. Contreras, Palo Alto, CA (US); Joey M. Poss, Rochester, MN (US); Ronald Chang, Fremont, CA (US); Bernhard E. Knigge, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/545,028

(22) Filed: Dec. 19, 2023

(65) Prior Publication Data

US 2024/0175765 A1 May 30, 2024

Related U.S. Application Data

(63) Continuation of application No. 17/883,989, filed on Aug. 9, 2022, now Pat. No. 11,874,182.

(60) Provisional application No. 63/357,572, filed on Jun. 30, 2022.

(51) Int. Cl.
*G11B 21/02* (2006.01)
*G01K 7/24* (2006.01)
*G11B 5/60* (2006.01)

(52) U.S. Cl.
CPC ............... *G01K 7/24* (2013.01); *G11B 5/607* (2013.01)

(58) Field of Classification Search
None
See application file for complete search history.

(56) References Cited

U.S. PATENT DOCUMENTS

| 7,660,068 B1 | 2/2010 | Baumgart et al. |
| 7,830,634 B2 | 11/2010 | Chen et al. |
| 8,049,984 B2 | 11/2011 | Contreras et al. |

(Continued)

OTHER PUBLICATIONS

Chan et al., "Design of Chopper-Stabilized Amplifiers With Reduced Offset for Sensor Applications", IEEE Sensors Journal, 8(12): 1968-1980, Dec. 2008.

(Continued)

*Primary Examiner* — K. Wong
(74) *Attorney, Agent, or Firm* — Neugeboren O'Dowd PC

(57) ABSTRACT

Various illustrative aspects are directed to a data storage device comprising a slider with a resistive temperature detector (RTD) having a first resistance electrically connected to a first amplifier and a plurality of controlled current sources and switches, and one or more processing devices configured to: control the switches to generate an alternating-bias signal having a first clock frequency for biasing the first resistance, modulate an input signal of the first amplifier using the first clock frequency to generate a modulated signal, demodulate an amplified modulated signal at an output of a second amplifier using the first clock frequency to generate a resistance detection signal, the second amplifier coupled to the first amplifier, and process the resistance detection signal to determine the first resistance and/or a change in value of the first resistance.

14 Claims, 12 Drawing Sheets

(56) References Cited

U.S. PATENT DOCUMENTS

| | | |
|---|---|---|
| 8,482,872 B1 * | 7/2013 | Contreras ............ G11B 5/6076 360/75 |
| 8,487,691 B1 | 7/2013 | Kumar et al. |
| 8,797,667 B1 | 8/2014 | Barlow et al. |
| 8,804,263 B1 | 8/2014 | Contreras et al. |
| 8,837,076 B1 | 9/2014 | Cheng et al. |
| 8,976,481 B1 | 3/2015 | Zeng et al. |
| 10,965,254 B2 | 3/2021 | Moretti et al. |
| 11,874,182 B1 | 1/2024 | Contreras et al. |
| 2012/0120522 A1 | 5/2012 | Johnson et al. |
| 2014/0023108 A1 | 1/2014 | Johnson et al. |
| 2024/0003750 A1 | 1/2024 | Contreras et al. |

OTHER PUBLICATIONS

Sripathi, Vangipuram Canchi "Thermal Fly-height Control Slider Dynamics and Slider-Lubricant Interactions in Hard Disk", UC Berkeley Electronic Theses and Dissertations, 153 pages, 2011.

* cited by examiner

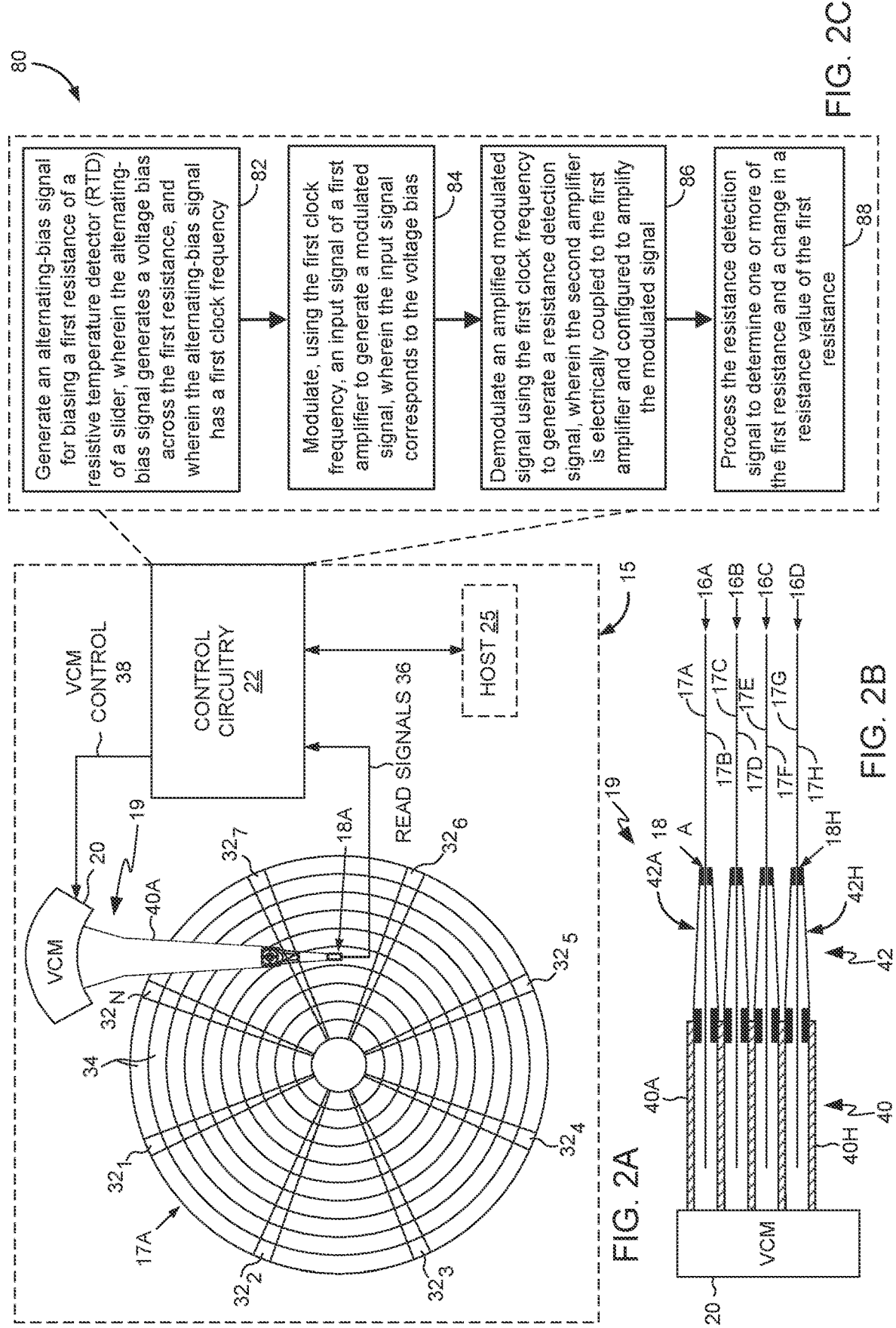

ALTERNATING-BIAS SIGNAL RESISTANCE DETECTION FOR RESISTIVE TEMPERATURE DETECTORS IN DISK DRIVES

CLAIM OF PRIORITY UNDER 35 U.S.C. § 119

The present application for patent is a continuation application of U.S. patent application Ser. No. 17/883,989 entitled "ALTERNATING-BIAS SIGNAL RESISTANCE DETECTION FOR RESISTIVE TEMPERATURE DETECTORS IN DISK DRIVES" filed Aug. 9, 2022 which claims priority to Provisional Application No. 63/357,572 entitled "ALTERNATING-BIAS SIGNAL RESISTANCE DETECTION FOR RESISTIVE TEMPERATURE DETECTORS IN DISK DRIVES" filed Jun. 30, 2022 and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A shows a prior art disk format 2 as comprising a number of radially-spaced, concentric servo tracks 4 defined by servo wedges 60-6N recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Hard disk drives (HDD) include read and write transducers that reside within a slider, which flies over a recording media/disk. Increasing demand in data density requires that the read and write transducers fly closer to the media. Accordingly, the fly-height between the slider and disk is increasingly important as storage densities also increase. As flying heights diminish, it becomes more relevant to accurately control the head-disk distance (i.e., the distance between the read-write heads and the disk). The fly-height of the slider relative to the disk can be estimated by measuring the resistance of a resistive temperature detector (RTD), such as a resistance of an embedded contact sensor (ECS) resistance or a nearfield temperature sensor (NTS). Specifically, but without limitation, the RTD can be used to sense the temperature near the air-bearing surface (ABS), from which the fly-height can be estimated. Currently used techniques for detecting a resistance value of the RTD (e.g., ECS, NTS) or a delta/change in a resistance value of the RTD utilizes two modes, namely an alternating current (AC) mode and a direct current (DC) mode. The AC and DC modes may also be referred to as high frequency (HF) and low frequency (LF) modes, respectively. In some cases, the AC mode is utilized to scan for defects during the HDD manufacturing phase, while the DC mode is utilized during regular operation of the disk drive (e.g., to have real-time feedback on fly-height). While some resistance detection architecture(s) used in today's disk drives support the use of dual modes they are generally limited to single path monitoring (or single path sensing). In other words, the HDD has to switch between the AC mode for defect scanning and the DC mode for monitoring the resistance of the RTD (e.g., $R_{ECS}$ or $R_{NTS}$, or the delta/change in the $R_{ECS}$ or $R_{NTS}$). Furthermore, extracting the DC/LF resistance value of the RTD often requires averaging numerous measurement values (e.g., 50+ averages). As such, the dual mode single path monitoring in the prior art is time consumptive, for instance, during HDD manufacturing and testing. Aspects of the present disclosure are directed to a dual path monitoring resistance detection architecture that supports continuous dual modes, namely AC and DC modes, operation. Dual path monitoring of the AC (or HF) and DC (or LF) paths may serve to reduce the test time for HDD's, for instance, by up to 10 hrs, up to 20 hrs, up to 60 hrs, etc.

Various illustrative aspects are directed to a data storage device comprising a slider with a resistive temperature detector (RTD), the RTD having a first resistance electrically connected to a first amplifier circuit and one or more processing devices. The one or more processing devices of the data storage device are configured to generate an alternating-bias signal for biasing the first resistance, where the alternating-bias signal generates a voltage bias across the first resistance, and where the alternating-bias signal has a first clock frequency; modulate an input signal of the first amplifier circuit using the first clock frequency to generate a modulated signal, where the input signal corresponds to the voltage bias; demodulate, at an output of a second amplifier, an amplified modulated signal using the first clock frequency to generate a resistance detection signal, where the second amplifier is electrically coupled to the first amplifier circuit and configured to amplify the modulated signal; and process the resistance detection signal to determine one or more of the first resistance and a change in a resistance value of the first resistance.

Various illustrative aspects are directed to a method for operating a data storage device comprising generating an alternating-bias signal for biasing a first resistance of a resistive temperature detector (RTD) of a slider, where the alternating-bias signal generates a voltage bias across the first resistance, and where the alternating-bias signal has a first clock frequency; modulating, using the first clock frequency, an input signal of a first amplifier to generate a modulated signal, where the input signal corresponds to the voltage bias; demodulating, at an output of a second amplifier, an amplified modulated signal using the first clock frequency to generate a resistance detection signal, where the second amplifier is electrically coupled to the first amplifier and configured to amplify the modulated signal; and processing the resistance detection signal to determine one or more of the first resistance and a change in a resistance value of the first resistance.

Various illustrative aspects are directed to one or more processing devices comprising means for generating an alternating-bias signal for biasing a first resistance of a resistive temperature detector (RTD) of a slider, where the alternating-bias signal generates a voltage bias across the first resistance, and where the alternating-bias signal has a first clock frequency; means for modulating, using the first clock frequency, an input signal of a first amplifier circuit to generate a modulated signal, where the input signal corresponds to the voltage bias; means for demodulating, at an output of a second amplifier, an amplified modulated signal using the first clock frequency to generate a resistance detection signal, where the second amplifier is electrically coupled to the first amplifier and configured to amplify the modulated signal; and means for processing the resistance detection signal to determine one or more of the first resistance and a change in a resistance value of the first resistance.

In some implementations, the data storage device further comprises a plurality of controlled current sources and a plurality of switches, where each switch of the plurality of switches is electrically connected to the first resistance and to at least one controlled current source of the plurality of controlled current sources. In some implementations, the one or more processing devices are further configured to control the plurality of switches to generate the alternating bias signal for biasing the first resistance, the alternating bias signal comprising an alternating bias current, where the alternating bias current flows through the first resistance of the RTD to generate the voltage bias.

In some implementations of the data storage device, the method, and the one or more processing devices, the data storage device further comprises a modulator for modulating the input signal, a demodulator for demodulating the amplified modulated signal using the first clock frequency to generate a demodulated signal, and a low-pass filter coupled at an output of the second amplifier circuit, where the low-pass filter filters the demodulated signal to generate the resistance detection signal.

Some implementations of the data storage device, the method, and the one or more processing devices further include processes, features, means, or instructions for processing the resistance detection signal in a high frequency (HF) mode and a low frequency (LF) mode, wherein processing the resistance detection signal in the HF mode comprises detecting one or more signal spikes in a HF response of the resistance detection signal, and wherein processing the resistance detection signal in the LF mode comprises monitoring one or more of the first resistance and the change in the resistance value of the first resistance for determining a fly-height of a slider in real-time or substantially real-time.

In some implementations of the data storage device, method, and one or more processing devices described above, the alternating bias signal comprises an alternating bias current, wherein the alternating bias current flows through the first resistance of the RTD to generate the voltage bias. In some implementations of the data storage device, method, and one or more processing devices described above, modulation of the input signal removes or reduces 1/f noise associated with one or more of the alternating-bias signal, the first amplifier circuit, and the second amplifier circuit.

In some implementations of the data storage device, method, and one or more processing devices described above, the first clock frequency is at least 400 kHz, at least 500 kHz, at least 1 MHz, or at least 5 MHz. In some implementations of the data storage device, method, and one or more processing devices described above, a cut-off frequency of a low-pass filter coupled at the output of the second amplifier circuit is based at least in part on the first clock frequency, wherein the cut-off frequency of the low-pass filter is at least 200 KHz.

In some implementations of the data storage device, method, and one or more processing devices described above, the first amplifier circuit comprises a low-noise amplifier (LNA), where the LNA utilizes common-gate and alternating current (AC) coupling at its input.

In some implementations of the data storage device, method, and one or more processing devices described above, an input of one or more of the first amplifier circuit and the second amplifier circuit is chopped based at least in part on the modulation. In some implementations of the data storage device, method, and one or more processing devices described above, the alternating-bias signal is differential with a common-mode control (IVC).

In some implementations of the data storage device, method, and one or more processing devices described above, the second amplifier circuit comprises an AC gain. In some implementations of the data storage device, method, and one or more processing devices described above, the modulation of the input signal removes or reduces 1/f noise associated with one or more of the alternating-bias signal, the first amplifier circuit, and the second amplifier circuit.

In some implementations of the data storage device, method, and one or more processing devices described above, the RTD comprises one of an embedded contact sensor (ECS) and a nearfield temperature sensor (NTS).

Various illustrative aspects are directed to a control circuitry comprising a first amplifier circuit; a second amplifier circuit; a source for generating an alternating bias signal for biasing a first resistance of a resistive temperature detector (RTD), wherein the alternating-bias signal generates a voltage bias across the first resistance, and wherein the alternating bias signal has a first clock frequency; a modulator for modulating, using the first clock frequency, an input signal of the first amplifier circuit to generate a modulated signal, wherein the input signal corresponds to the voltage bias; a demodulator demodulating, at an output of the second amplifier circuit, an amplified modulated signal using the first clock frequency to generate a resistance detection signal, wherein the second amplifier is electrically coupled to the first amplifier circuit and configured to amplify the modulated signal; and a low-pass filter coupled at an output of the second amplifier circuit, wherein the low-pass filter filters the demodulated signal to generate the resistance detection signal.

In some implementations, the control circuitry further comprises a resistance detection circuit for processing the resistance detection signal to determine one or more of the first resistance and a change in a resistance value of the first resistance. In some implementations, the resistance detection circuit is further configured to process the resistance detection signal in a high frequency (HF) mode and a low frequency (LF) mode, wherein processing the resistance detection signal in the HF mode comprises detecting one or more signal spikes in a HF response of the resistance detection signal, and processing the resistance detection signal in the LF mode comprises monitoring one or more of the first resistance and the change in the resistance value of the first resistance for determining a fly-height of a slider in real-time or substantially real-time.

In some implementations, the source for generating the alternating bias signal comprises a plurality of controlled current sources and a plurality of switches.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, in accordance with aspects of the present disclosure.

FIG. 2C illustrates a method that a data storage device may perform, execute, and implement, in accordance with aspects of the present disclosure.

DETAILED DESCRIPTION

Figure 1A:
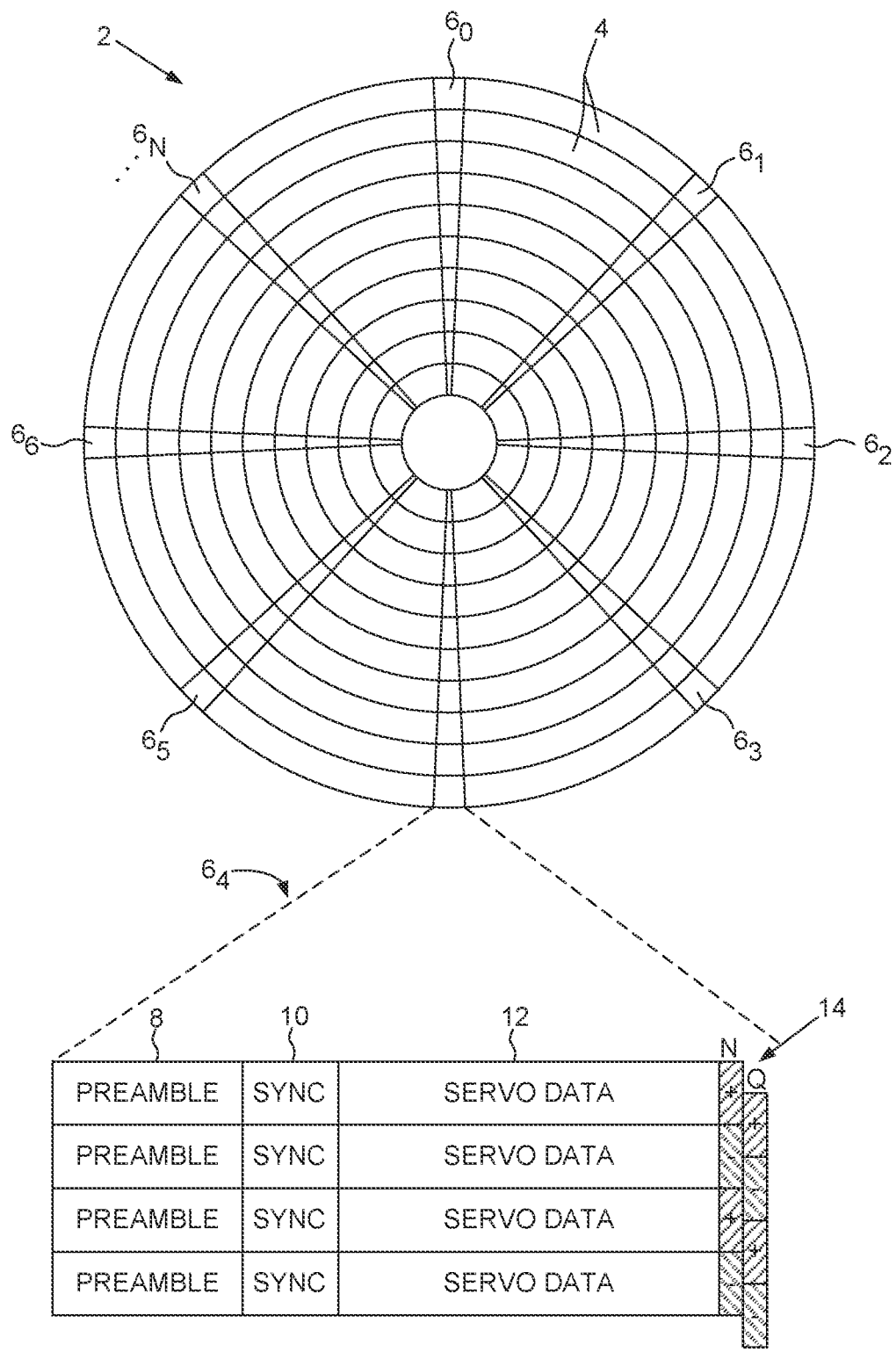
FIG. 1A shows a prior art disk format as comprising a number of radially-spaced, concentric servo tracks defined by servo wedges recorded around the circumference of each servo track.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

As a disk rotates under a slider of a hard disk drive (HDD), the slider 103 is said to "fly" above the disk. Typically, the spacing between the read/write elements of the slider and the disk is quite small. Furthermore, in some circumstances, contact can occur between the slider and the disk, which can adversely impact disk drive operations. As such, controlling the fly-height is an important aspect of disk drive design. In some cases, a thermal fly-height control (TFC) device (e.g., heater element) can be disposed within a slider (e.g., slider 103, slider 303) to contort the slider near the read and write transducers (or elements), which lowers the fly-height for the read and write transducers. To verify the relative fly-height, the read-back signal's amplitude and a Wallace spacing loss relationship can be utilized. However, the read-back signal measurement may not provide an accurate fly-height. With a slider flying as close as possible to a disk, write element slider-media contact (WEC) may occur, which creates unstable slider-fly dynamics, which in turn, creates data imprint errors in the media. Moreover, fly-height is also affected by lubricant-slider interaction and electrostatic force.

In some examples, read and write elements or transducers reside in the slider of an HDD. As flying heights diminish, it becomes more relevant to accurately control the head-disk distance (i.e., the distance between the read-write heads and the disk). Two items that can negatively affect the fly-height of the slider are lubricant-slider interaction, such as lube pickup, and electrostatic force. The negative effects of both of these items can be diminished and/or eliminated by controlling the slider's voltage potential with respect to the disk's potential. Therefore, controlling the slider's voltage reduces slider wear and allows for lower flying-heights. This voltage-controlled slider can also be a component of other architecture features such as: fly-height modulation, active damping, pre-contact detection, fly-height measurement and control, disk defect mapping, and high-frequency detection for additional spacing feedback information.

In some cases, a disk drive may comprise fly-height control circuitry 106 that interfaces with fly-height components in the slider. Thermal fly-height control (TFC) is one prior art control technique that uses a heater element (not shown) disposed in the slider. The fly-height can be adjusted by heating the slider with the heater. Electrical current supplied to the heater by fly-height control circuitry 106 generates heat to thermally expand the slider and modulate the fly-height. The fly-height components 109 can also include other elements in addition to the heater. In some cases, the relative temperature at an air bearing surface (ABS) may be used to estimate the resistance, $R_{RTD}$, of a resistive thermal detector (RTD), such as an embedded contact sensor (ECS) or a nearfield temperature sensor (NTS). Typically, the resistance of a material can be represented as a function of its intrinsic resistance and its dimensions (e.g., length, width, thickness or height). A fly-height control system can also include embedded contact sensors (ECS) 108 in the slider along the associated ECS control circuitry 107 in the arm electronics (AE) 102. RTDs have been used in sliders in the prior art to determine when the read/write head makes physical contact with the magnetic-recording disk based upon changes in the temperature of the slider when contact occurs. RTD architectures can use a single temperature sensor that measures temperature based on the amount of voltage across a single temperature sensor. In some examples, a distributed temperature detector architecture may be used in a head disk interface system of a hard-disk drive (HDD). For example, the slider 103 can include a first temperature sensor that is located relatively near an air bearing surface (ABS) and a second temperature sensor that is offset from the ABS. The read/write integrated circuit (IC) may be configured to detect when the slider 103 makes physical contact with a disk 16 based on a difference in temperature measured by the first and second temperature sensor. In some cases, the first and second temperature sensors may form a bridge circuit, such as a Wheatstone bridge, with a first IC resistor and a second IC resistor that both reside in the read/write IC, allowing the temperature of the read/write head to be accurately measured.

Figure 1B:
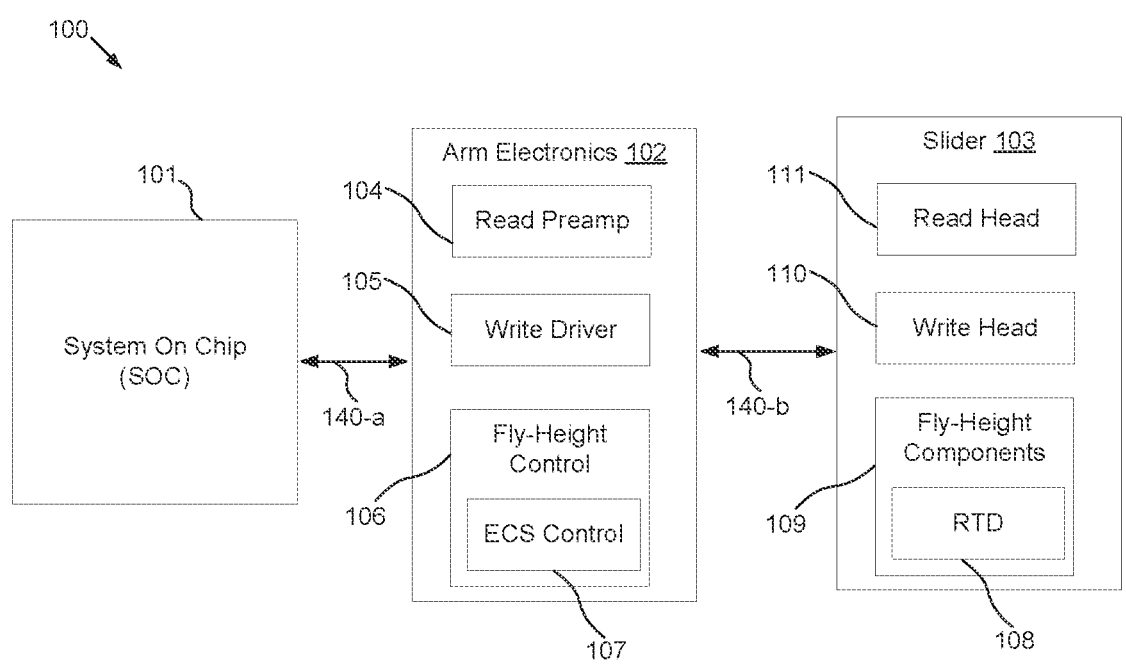
FIG. 1B shows a block diagram illustration of selected components of a disk drive, in accordance with aspects of the present disclosure.

A disk drive 100 according to various aspects of the disclosure, as seen in FIG. 1B, as with conventional disk drives, typically includes a main integrated circuit, which is typically called a system on a chip (SOC) 101 that contains many of the electronics and firmware for the drive and are used to control the functions of the drive including providing power and/or control signals to the components shown in AE chip 102. Each disk (shown as disks 16A-D in FIG. 2B) can have thin film magnetic material on each of the planar surfaces. Each recording surface normally has a dedicated pair of read and write heads packaged in a slider 103 that is mechanically positioned over the rotating disk by an actuator (e.g., shown as actuator assembly 19 in FIG. 2B). In some examples, the actuator(s) also provide the electrical connections to the slider 103 components. The actuator assembly 19 may also comprise the arm electronics (AE) chip 102 which typically include preamps (e.g., read preamp 104) for the read head 111, write driver 105 and fly-height controls 106. In some examples, the fly-height control circuit 106 includes an embedded contact sensor (ECS) control circuit 107. In other cases, a nearfield temperature sensor (NTS) may be used, for example, when the disk drive employs heat assisted magnetic recording (HAMR), in which case an NTC control circuit would be provided in the AE chip 102. It is noted that some of the components shown in AE 102 can be implemented or partially implemented in SOC 101 according to various aspects.

As seen, a first connection (e.g., flex cable) 140-a connects the SOC 101 to the AE 102, while a second connection (e.g., flex cable) 140-b connects the AE 102 to the slider 103. The AE 102 typically include digital and analog circuitry that control the signals sent to components in the slider 103 and process the signals received from the slider 103 components. The AE 102 can include registers that are set using serial data from the SOC 101 to provide parameters for the AE functions. The write driver 105 generates an analog signal that is applied to an inductive coil in the write head 110 to write data by selectively magnetizing portions of the magnetic material on the surface of the rotating disk(s) 16.

As seen, slider 103 includes write head 110 configured to write data to a disk, a read head 111 configured to read data from the disk, fly-height components 109 configured to adjust slider fly-height (as described above) and resistive temperature detector (RTD) 108, such as an ECS or NTS, for sensing the temperature near the air-bearing surface (ABS). It is noted that ABS is generally used to describe the surface of the slider facing the disk, where the disk drive could be filled with gases other than air (e.g., gases containing helium, hydrogen, to name two non-limiting examples) and that the use of the "ABS" term to describe various aspects of the disclosure is not intended to limit the disclosure to air filled drives.

In some cases, the RTD 108 is located proximate the ABS and write head 110 (or alternatively the read head 111). The RTD 108 facilitates in detecting a temperature generated by the slider's proximity to the disk or media. In other words, RTD 108 facilitates in detecting when slider 103 changes fly-height and/or comes into physical contact with the disk. For example, if slider 103 comes into physical contact with the disk, then heat generated from the friction between the slider and the disk increases the resistance of the RTD 108. Also, changes in fly-height may change the temperature of the RTD 108. Additionally, the RTD 108 changes in temperature can be altered by air-cooling effects which can then be accounted for by a rate of change (slope) in the temperature changes in the RTD 108. Accordingly, a voltage across the RTD 108 changes (e.g., increases by heat generated by physical contact with the disk). In one embodiment, real-time write-element (read-element) contact is measured via the RTD 108. In various embodiments, the RTD 108 may comprise a thermal strip (e.g., metallic or semiconductor strip) on the slider 103.

In some examples, the disclosed disk drive may be configured to detect real-time slider fly-height and/or media-disk contact based on temperature changes by the slider 103 contacting the disk (and/or temperature changes based on changes in fly height). As fly-height and/or friction caused by media-disk contact heats the RTD 108, a voltage across the RTD 108 increases (as described above). In some examples, a bias (voltage or current) is placed across the nodes/terminals of the RTD 108. Accordingly, real-time media-disk temperature change via a change in resistance of the RTD 108 and/or change in voltage across the RTD 108 can be detected. In some cases, the slider bias potential can be controlled via the RTD 108. In one embodiment, the RTD 108 (e.g., ECS resistance or $R_{ECS}$) can be driven in a common mode on its nodes (e.g., direct current (DC)). For example, a voltage (DC slider bias or $V_{sbd}$), which is a slider bias in a common mode, can be added to the differential mode across the nodes electrically coupled to the slider. In some other cases, the RTD 108 can be driven in a common-mode and using an alternating bias (AC) configuration (e.g., a few kilohertz (kHz)). For example, a voltage (AC slider bias or $V_{sba}$) may be applied across the terminals/nodes of the RTD 108. In some instances, an increase of an AC bias allows for AC dithering (e.g., at 250 kHz), which may be used to determine ABS stiffness. This method of AC dithering may be utilized in a pre-contact procedure. In another embodiment, shunting at the slider 103 is at a wafer level and it can be combined with resistor connections (e.g., 10 k Ohms) in the slider (e.g., slider 103, slider 303). Additional details for generating and controlling slider bias potential is described in relation to FIGS. 3A and/or 3B below.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 321 through 32N) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

In some examples, the control circuitry 22 is configured to perform the steps of method flow 80 shown in FIG. 2C. Specifically, but without limitation, the control circuitry 22 is configured to generate an alternating-bias signal for biasing a first resistance of a resistive temperature detector (RTD) of a slider (82), where the alternating-bias signal generates a voltage bias across the first resistance, and where the alternating-bias signal has a first clock frequency. In some cases, the control circuitry 22 is configured to modulate, using the first clock frequency, an input signal of a first amplifier to generate a modulated signal (84), where the input signal corresponds to the voltage bias. Further, the control circuitry 22 is configured to demodulate an amplified modulated signal using the first clock frequency to generate a resistance detection signal (86), where the second amplifier is electrically coupled to the first amplifier and configured to amplify the modulated signal. In some examples, the control circuitry 22 is configured to process the resistance detection signal to determine one or more of the first resistance and a change in a resistance value of the first resistance (88). In some cases, the first amplifier circuit may comprise a low-noise amplifier (LNA), such as LNA 704 or LNA 904 in FIGS. 7 and 9. Additionally, the second amplifier may be an AC gain (e.g., shown as gain 729 in FIG. 7), or any other type of AC amplifier known and contemplated in the art. In some examples, the control circuitry is configured to control a plurality of switches to generate the alternating-bias signal (e.g., an AC signal) for biasing the first resistance of the RTD of the slider. Further, the clock control used to generate the alternating-bias signal at the first clock frequency may be coupled to a modulator at an input of the first amplifier (e.g., LNA) and/or a demodulator coupled at the output of the second amplifier (e.g., gain 729, amplifier 984). In some examples, the RTD may be one of an embedded contact sensor (ECS) or a nearfield temperature sensor (NTS).

In the embodiment of FIG. 2A, the control circuitry 22 may also process a read signal 36 emanating from the head 18 to demodulate servo data written on the disk (e.g., servo sectors 32) to generate a position error signal (PES) representing an error between the actual position of the head and a target position relative to a target track. The control circuitry 22 may process the PES using a suitable servo control system to generate the VCM control signal 38 applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40. The read signal 36 may also be processed by the read channel in the disk drive to recover data written to the disk.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the BEMF voltage generated by the VCM 20 during a calibration seek (where the BEMF voltage represents an estimated velocity of the VCM). The bootstrap spiral track is then written to the disk using the feed-forward compensation.

Besides read signals 36, while not explicitly shown, the signals from the RTD in the slider near disk head 18 are received in the control circuitry 22 for processing, to aid in the fly height and/or contact detection as discussed above and in the various aspects below.

For simplicity of description, certain notations in the following figures and associated description will use ECS as the primary example, but the described aspects would be equally applicable to any RTD implementations including for NTS.

In accordance with aspects of the present disclosure, continuous dual mode (e.g., AC, DC modes) and dual path monitoring may be implemented with added modulation, which serves to reduce noise (e.g., bias noise or 1/f noise) as compared to the prior art. As used herein, the term "bias noise" may refer to the noise associated with the slider and/or RTD bias. As noted above, processing and analysis of the RTD bias may help monitor the resistance of the RTD (e.g., $R_{ECS}$ or $R_{NTS}$) and/or the changes in the RTD resistance, which facilitates in monitoring the fly-height of the slider, slider-disk contact detection, and/or defect scanning, to name a few non-limiting examples. In some cases, the RTD may be biased using a current bias pulse, where the current bias pulse is generated using a plurality of controlled current sources and a plurality of switches. While not necessary, the switches may be arranged in an H-bridge or Wheatstone bridge configuration. Further, the current bias pulse may flow through the $R_{ECS}$ and impose a bias voltage across the $R_{ECS}$, where the $R_{ECS}$ is electrically coupled at an input of a low noise amplifier (LNA), such as LNA 704 in FIG. 7. That is, in some embodiments, an alternating-bias signal (simply referred to as AC bias) may be used to bias the $R_{ECS}$, where the output voltage (e.g., $V_{BIAS}$ across the $R_{ECS}$) may be provided from the controlled current sources, further described below in relation to FIG. 7.

Figure 3A:
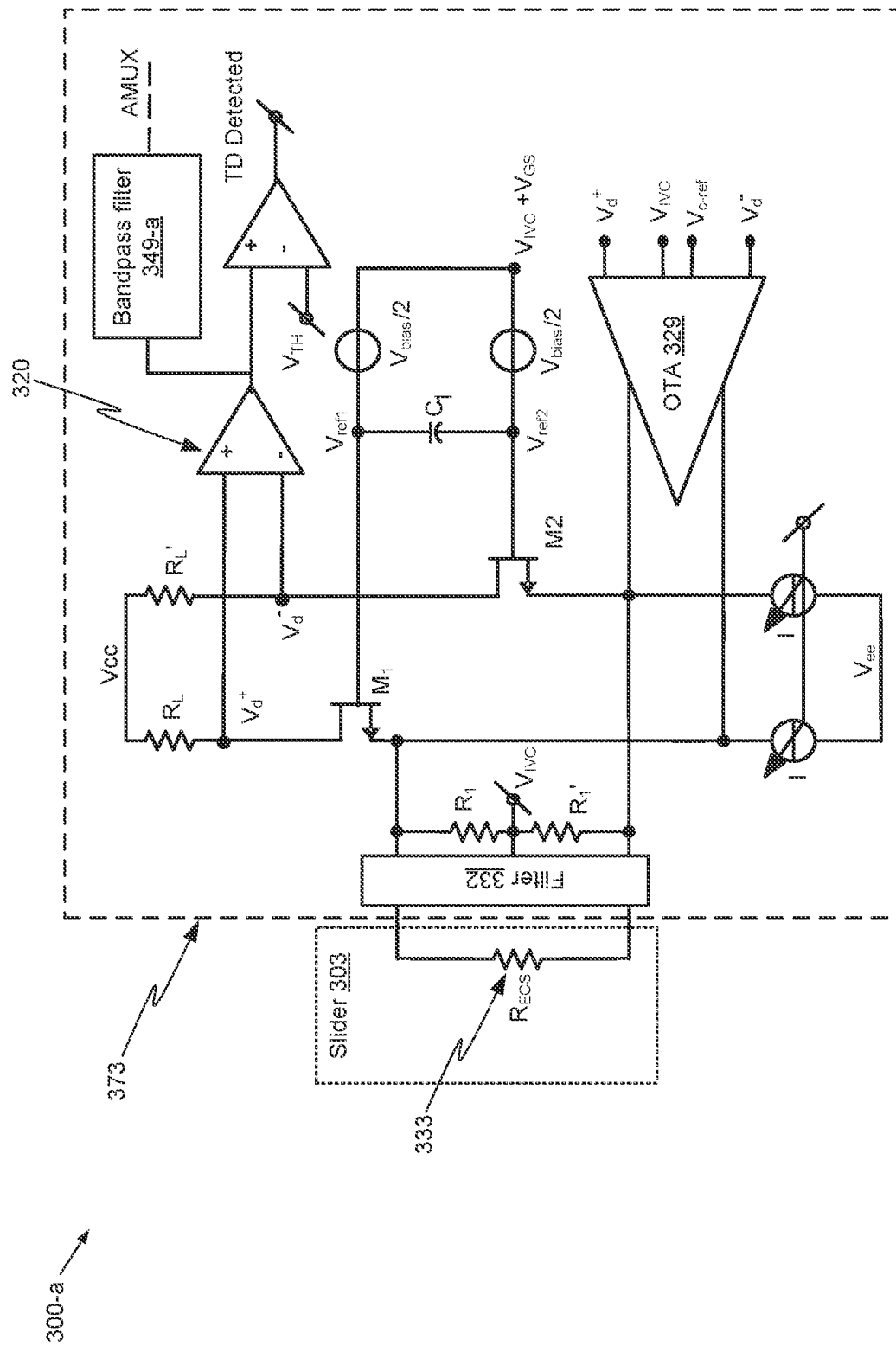
FIG. 3A illustrates a schematic diagram of one topology option of a resistive temperature detector (RTD) amplifier, such as, an embedded contact sensor (ECS) amplifier and/or a nearfield temperature sensor (NTS) amplifier, in accordance with aspects of the present disclosure.

FIG. 3A illustrates a schematic diagram 300-a of one topology option (e.g., a common-gate topology) of a signal amplifier, such as, an embedded contact sensor (ECS) signal amplifier and/or a nearfield temperature sensor (NTS) amplifier, in accordance with aspects of the present disclosure. Here, the circuitry within the dashed region 373 comprises the ECS or NTS signal amplifier, where the signal amplifier is located within the chip (e.g., SOC 101 or AE chip 102 in FIG. 1B, control circuitry 22 in FIG. 2A). Further, the signal amplifier topology option shown in FIG. 3A depicts one non-limiting example of a low impedance amplifier. In some cases, the ECS or NTS signal amplifier optionally includes a bandpass filter 349-a.

As seen, the data storage device comprises a slider 303 having a first resistance ($R_{ECS}$) 333, where the $R_{ECS}$ 333 is electrically coupled to the ECS signal amplifier. In some examples, the ECS resistance 333 may be coupled to a pre-filter 332. The pre-filter serves to reduce bandwidth (e.g., cross-talk) of the ECS signal (e.g., a voltage signal). In this example, the signal amplifier comprises a differential operational transconductance amplifier (diff OTA), such as OTA 329, with controlled common-mode (CM) input. In some cases, when a DC voltage is applied between the gates of the OTA 329, it behaves as a differential OTA with common mode. As seen, diff OTA 329 includes inputs differential voltage ($V_d+$), common-mode voltage ($V_{c-ref}$), slider potential ($V_{ivc}$), and differential voltage ($V_d-$).

As illustrated, the $R_{ECS}$ is coupled to the diff OTA 329. In some cases, an RTD bias voltage (e.g., $V_{bias}$) is imposed across bases of switches $M_1$ and $M_2$. Further, the diff OTA feedback forces $V_{bias}$ across the RTD resistor (e.g., $R_{ECS}$). In some examples, a plurality of resistances (not shown) may be coupled to the ECS resistance (e.g., one at each end of the $R_{ECS}$). These resistances may be coupled to the slider 303, such that there is a coupling from the common-mode OTA input (i.e., $V_{c-ref}$) to the slider 303.

In some embodiments, an additional feedback is created by sensing $V_{IVC}$ of the amplifier's input between the series coupling of resistors $R_1$ and $R_1'$. Vo-ref is compared to $V_{IVC}$, and the feedback forces Vo-ref to be equivalent with $V_{IVC}$. In such cases, Vo-ref would then be equal to a programmable interface voltage control ($V_{IVC}$). In some examples, the slider bias (e.g., shown as $V_{BIAS}$ 435 in FIG. 4) may be controlled by setting Vo-ref at the OTA 329.

In some cases, the diff OTA 329 output ($V_d+$, $V_d-$) is coupled to a buffer 320, and then to a threshold (TH) detector. TH detector compares the input voltage (e.g., $V_{refl}$) to a programmable reference voltage ($V_{TH}$). Accordingly, if a contact asperity occurs (e.g., disk-media contact), the TD detected output will signal that a disturbance has occurred with the head-disk interface.

In one embodiment, slider potential is controlled by controlling a voltage (not shown) in the slider 303, through the resistances coupled to the slider 303. It should be appreciated that there may be a differential mode for $R_{ECS}$ 333 and a common mode control for the voltage in the slider. In some cases, both modes may be operated at the same time.

While not necessary, in some examples, the resistances ($R_L$ and $R_L'$; $R_1$ and $R_1'$) may be matched. Furthermore, the signal amplifier shown in FIG. 3A may be controlled using a voltage interface control (shown as $V_{IVC}$ at the input of the OTA 329). In some cases, the signal amplifier topology option shown in FIG. 3A is directed to a common-gate option, while the signal amplifier topology option shown in FIG. 3B (described below) is directed to a quad common-source option. It should be noted that, other signal amplifier topologies are contemplated in different embodiments and the examples shown in FIGS. 3A and 3B are not intended to limit the scope of the disclosure.

Figure 3B:
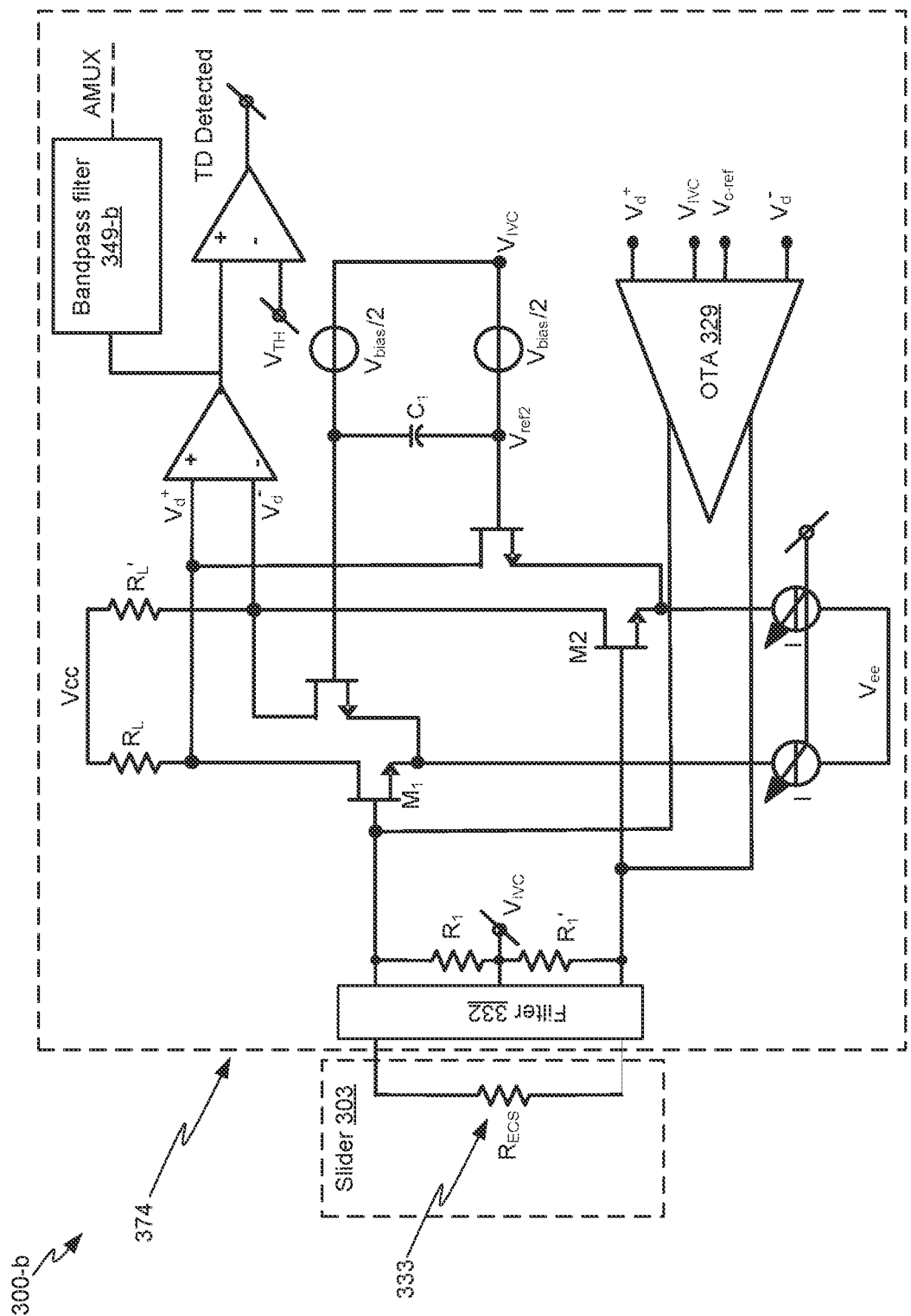
FIG. 3B illustrates a schematic diagram of another topology option of a RTD amplifier, such as, an ECS and/or a NTS amplifier, in accordance with aspects of the present disclosure.

FIG. 3B illustrates a schematic diagram 300-b of another topology option (e.g., a quad common-source topology) of a signal amplifier, such as, an ECS and/or an NTS amplifier, in accordance with aspects of the present disclosure. Here, the circuitry within the dashed region 374 comprises the ECS or NTS signal amplifier, where the signal amplifier is located within the chip (e.g., SOC 101 or Arm Electronics (AE) 102 in FIG. 1B, control circuitry 22 in FIG. 2A). Further, the signal amplifier topology option shown in FIG. 3B depicts one non-limiting example of a high impedance amplifier. In some cases, the ECS or NTS signal amplifier in FIG. 3B optionally includes a bandpass filter 349-b. In some examples, the circuitry shown in FIG. 3B implements one or more aspects of the circuitry described in relation to FIG. 3A.

Similar to FIG. 3A, the data storage device comprises a slider 303 having a first resistance ($R_{ECS}$) 333, where the $R_{ECS}$ 333 is electrically coupled to the ECS or NTS signal amplifier. In some examples, the ECS resistance 333 is also coupled to a pre-filter 332, where the pre-filter serves to reduce bandwidth (e.g., cross-talk) of the ECS signal (e.g., a voltage signal). In this example, the ECS or NTS signal amplifier comprises an operational transconductance amplifier (OTA), such as OTA 329. Further, the OTA 329 is configured to behave as a differential OTA with common mode, for example, when a DC voltage is applied between its gates. While not necessary, in some examples, the resistances ($R_L$ and $R_L'$; $R_1$ and $R_1'$) may be matched. Furthermore, slider bias (e.g., shown as $V_{BIAS}$ 435 in FIG. 4) may be controlled using $V_{c\text{-}ref}$, or the voltage interface control (shown as $V_{IVC}$ at the input of the OTA 329).

Figure 4:
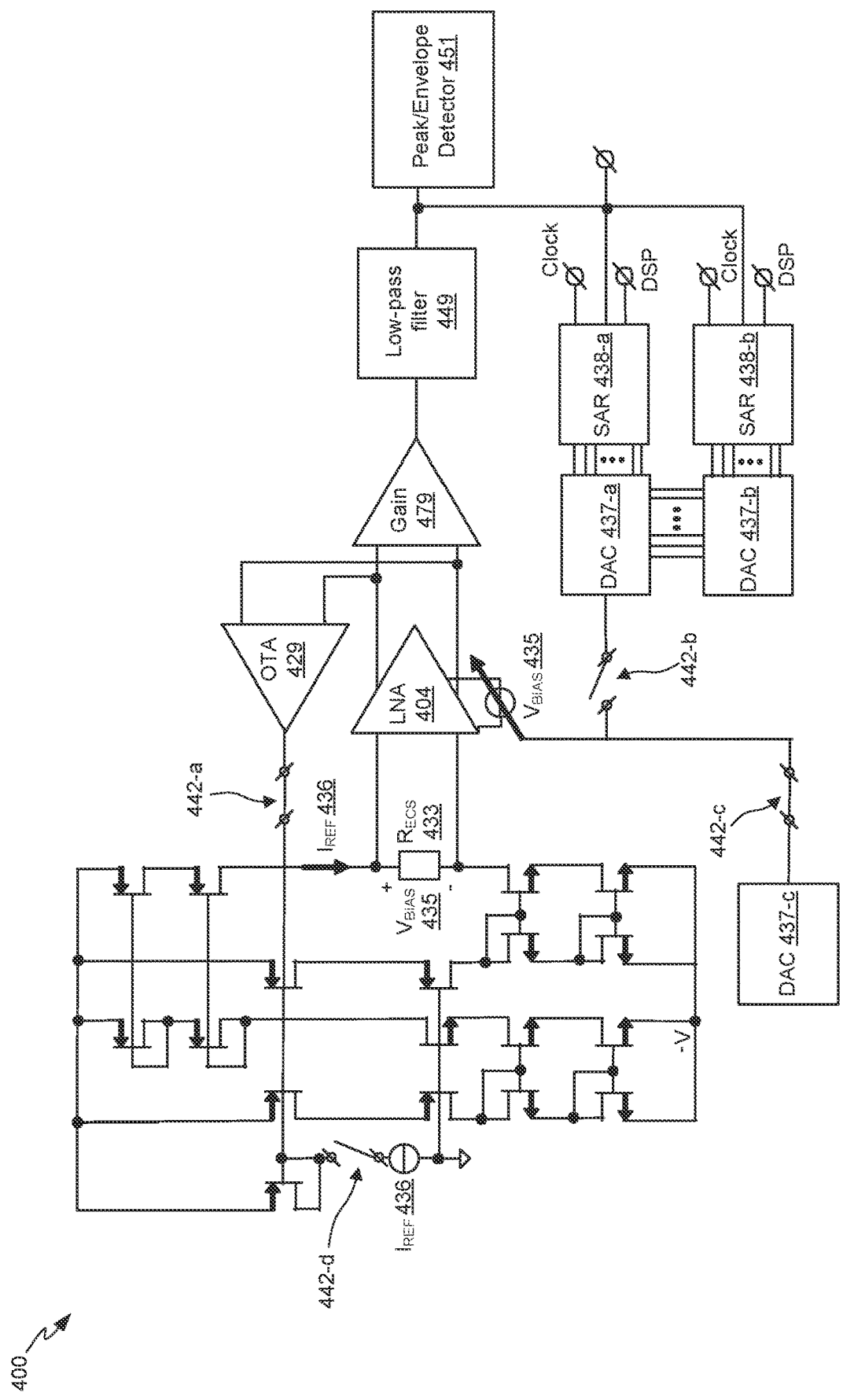
FIG. 4 illustrates a schematic diagram of a single path resistance detection circuit supporting dual mode monitoring in the prior art.

FIG. 4 illustrates a schematic diagram 400 of a single path resistance detection circuit supporting dual mode (e.g., AC, DC modes) monitoring, as seen in the prior art. As used herein, the term "single path" implies that only one of the two modes (e.g., AC and DC modes) can be monitored at a given time. As seen, the circuit shown in FIG. 4 comprises a plurality of switches 442 (e.g., switch 442-a, 442-b, 442-c, 442-d), an RTD (e.g., an ECS having a first resistance, $R_{ECS}$ 433), a LNA 404, one or more amplifiers (e.g., OTA 429, gain 479), a low pass filter (LPF) 449, and a peak/envelope detector 451. The circuit further includes one or more digital to analog converters (DACs), such as DAC 437-a, DAC 437-b, and DAC 437-c. In some examples, the DAC 437-a and successive approximation register (SAR) 438-a may be used to determine the $R_{ECS}$ 433 based on the biasing voltage ($V_{BIAS}$ 435) and the reference current ($I_{REF}$ 436), where $I_{REF}$ 436 is generated by a controlled current source, further described below.

In the AC or HF mode, the switches 442-a and 442-c are closed, and the switches 442-b and 442-d are open, which allows for defect scanning (e.g., signal spikes may be detected in the HF response, which allows identification of defects on the disk's surface during manufacturing). In the DC mode, the switches 442-d and 442-b are closed, and the switches 442-a and 442-c are open. The SAR-DAC circuitry comprising the DAC 437-a and the SAR 438-a is used to lock the biasing voltage ($V_{BIAS}$) with a constant current ($I_{REF}$), where the biasing voltage ($V_{BIAS}$ 435) is the voltage imposed across the ECS resistance by the current, $I_{REF}$. In some circumstances, an additional parallel loop comprising DAC 437-b and SAR 438-b is used to determine a fine offset, e.g., for determining a delta/change in the resistance value of $R_{ECS}$ 433. As noted above, the extraction of the LF (e.g., DC) resistance value may require numerous averages (e.g., 50+ averages), which is not only computationally expensive, but also time consumptive. Aspects of the disclosure are directed to a dual path monitoring architecture that supports continuous dual modes (e.g., AC and DC modes) operation. Furthermore, by reducing the amount of averaging required to extract the DC/LF resistance value, as compared to the prior art, the present disclosure allows for real-time or substantially real-time feedback on the fly-height of the slider.

Figure 5:
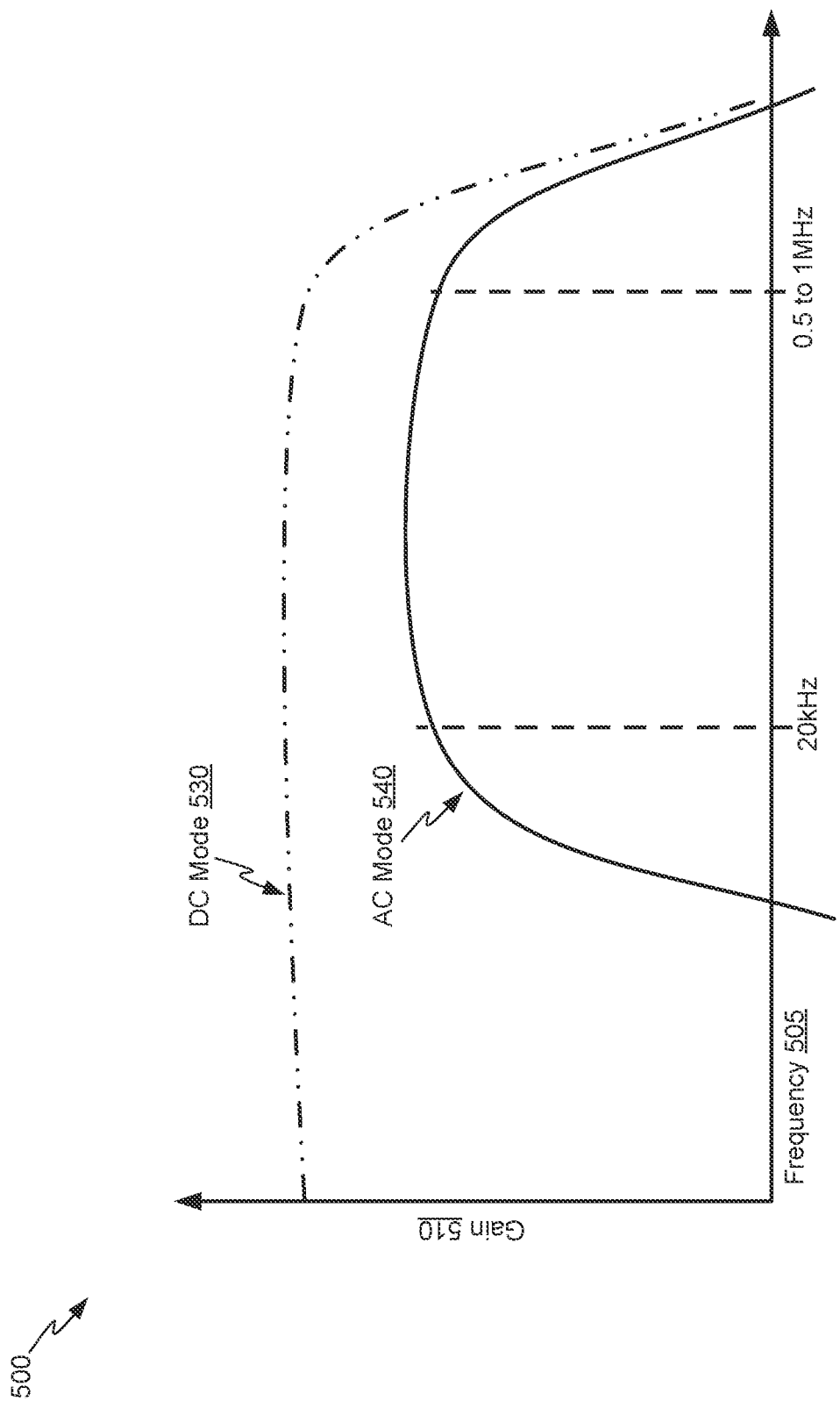
FIG. 5 illustrates an example of a graph depicting gain against frequency for the two modes in FIG. 4.

FIG. 5 illustrates an example of a graph 500 depicting gain 510 against frequency 505 for the AC and DC modes in the prior art, as previously described in relation to FIG. 4. Specifically, FIG. 5 depicts gain waveforms for the DC and AC modes 530 and 540, respectively, as seen in the single path monitoring with dual modes in the prior art.

In some circumstances, DC/LF fly-height transducer measurements are prone to noise degradation. Specifically, if the bias signal (e.g., ECS or slider bias, shown as $V_{BIAS}$ 435) is either slowly varying or otherwise constant (essentially a DC signal), then 1/f noise typically overwhelms the signal, as further described below in relation to FIG. 6. As used herein, a low-frequency signal may refer to a signal that is under 100 KHz. Aspects of the disclosure are directed to applying an alternating-bias signal to the slider/ECS, such that the read back signal is modulated to a high enough frequency such that the 1/f noise, bias noise, etc., is significantly reduced as compared to the prior art. Additionally, the alternating-bias signal resistance detection disclosed herein facilitates in dual path and continuous dual mode (i.e., AC, DC modes) monitoring.

Figure 6:
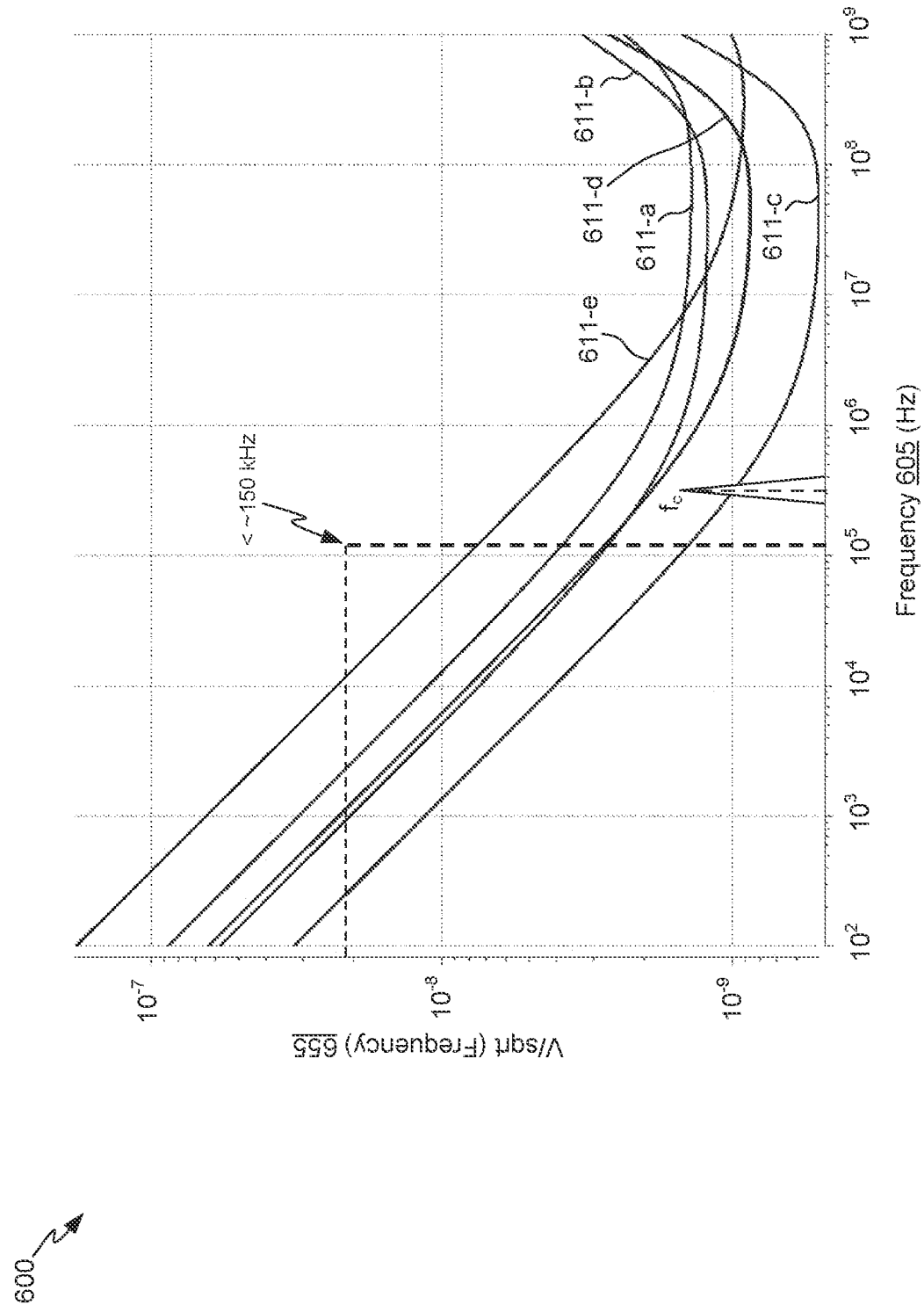
FIG. 6 illustrates an example of a graph depicting a relation between 1/f noise with respect to device size in the prior art.

FIG. 6 illustrates an example of a graph 600 depicting the 1/f noise (shown on vertical axis 655 in units of V/sqrt (frequency in Hz)) against frequency (shown on horizontal axis 605 in units of Hz) for different device sizes (e.g., different ratios of width/length, or W/L of the ECS resistance), where each of the curves 611 (e.g., curves 611-a . . . 611-e) corresponds to a different device size. As seen, the 1/f noise is quite high at low frequencies (e.g., when the frequency is <100-150 kHz). This 1/f noise adversely impacts the accuracy of the $R_{ECS}$ resistance measurements used to determine the slider's fly-height. In one non-limiting example, the goal may be to detect a minimum resistance measurement signal for a 0.1 nm fly-height (i.e., at a resolution of 0.1 nm), where the AR/fly-height is 0.30/nm. Further, a typical bias (e.g., ~2 mA) may be applied using a $R_{ECS}$ resistance of 100Ω, in which case the minimum signal amplitude (peak-to-peak) can be calculated to be 60 microvolts (uV). As seen, when the frequency is about 150 KHz, the noise can be calculated to be about 7.7 uV/rms (e.g., 20 nV/rt(Hz) with 150 KHz BW equates to ~7.7 uV/rms of noise). In accordance with aspects of the present disclosure, the 1/f noise can be reduced by modulating the ECS signal (e.g., above 100 kHz, above 150 kHz, above 500 kHz, etc.) followed by demodulation and filtering of the signal (e.g., filtering the signal to 150 kHz). In some examples, the bias noise includes the signal noise, as well as the 1/f noise. Chopping of the amplifier, alone, removes one or more of the amplifier's offset and noise including the 1/f noise of the amplifier (i.e., LNA 704). However, by adding an alternating bias (or chopping) at the input of the amplifier, the 1/f of the amplifier's bias noise may also be removed, as described below in relation to FIG. 7.

In some examples, an alternating-bias (or chopping) may be added at the input of an amplifier, such as an LNA. For example, an alternating-bias signal is used to bias the slider/$R_{ECS}$, which modulates the read back data (e.g., $V_{BIAS}$) that is subsequently amplified by the LNA 704. In accordance with aspects of the present disclosure, a chopping amplifier technique may be employed to help reduce 1/f and low frequency drift from ECS signals. Specifically, the chopper amplifier technique described herein may be used to translate the input signal power (e.g., to the LNA 704) to a frequency domain where the unwanted low frequency noise may be more easily filtered. In one non-limiting example, the ECS signal at the LNA may be modulated using a first clock frequency and shifted up in the frequency domain. The ECS signal may be modulated by controlling the opening/closing of the chopping switches 757 at the first clock frequency. Then, the modulated ECS signal is amplified, following which it is demodulated using a second clock frequency. The first and the second clock frequencies may be the same or different. Following demodulation of the amplified modulated ECS signal, the demodulated signal passes through a low-pass filter 749. In some embodiments, the $N^{th}$ order cut-off frequency of the low-pass filter is based on the clock frequency used for modulation/demodulation. In one non-limiting example, the clock frequency may be at or around 400 kHz, and the $N^{th}$ order cut-off frequency may be about half of the clock frequency (e.g., ~200 kHz). In some cases, the output signal at the output of the low-pass filter, herein referred to as the resistance detection signal, is processed by the one or more processing devices of the HDD to detect the $V_{BIAS}$, or the $V_{in}$ (input voltage to the LNA) from which the resistance value ($R_{ECS}$) or a change in the resistance value (ΔR) can be detected (i.e., since the current used to bias the slider/$R_{ECS}$ is known and controlled). In some embodiments, the alternating-bias is differential with a common-mode control (e.g., interface voltage control or IVC). In this way, the present disclosure supports continuous dual modes (i.e., AC and DC modes) operation, where the AC mode may be used for defect scanning during HDD manufacturing, and the DC mode may be used to monitor and/or average the $R_{ECS}$ and delta $R_{ECS}$ (Δ$R_{ECS}$). In some cases, changes in AR can be analyzed in various frequency bands for defect scanning (high-frequency), fly-height determination/monitoring (low-frequency), and signal dithering (mid-high frequency) can aid in rate of change (slope) detection in $R_{ECS}$, where the variations in the slope may be used to determine the different regions for the fly-height altitude.

Figure 7:
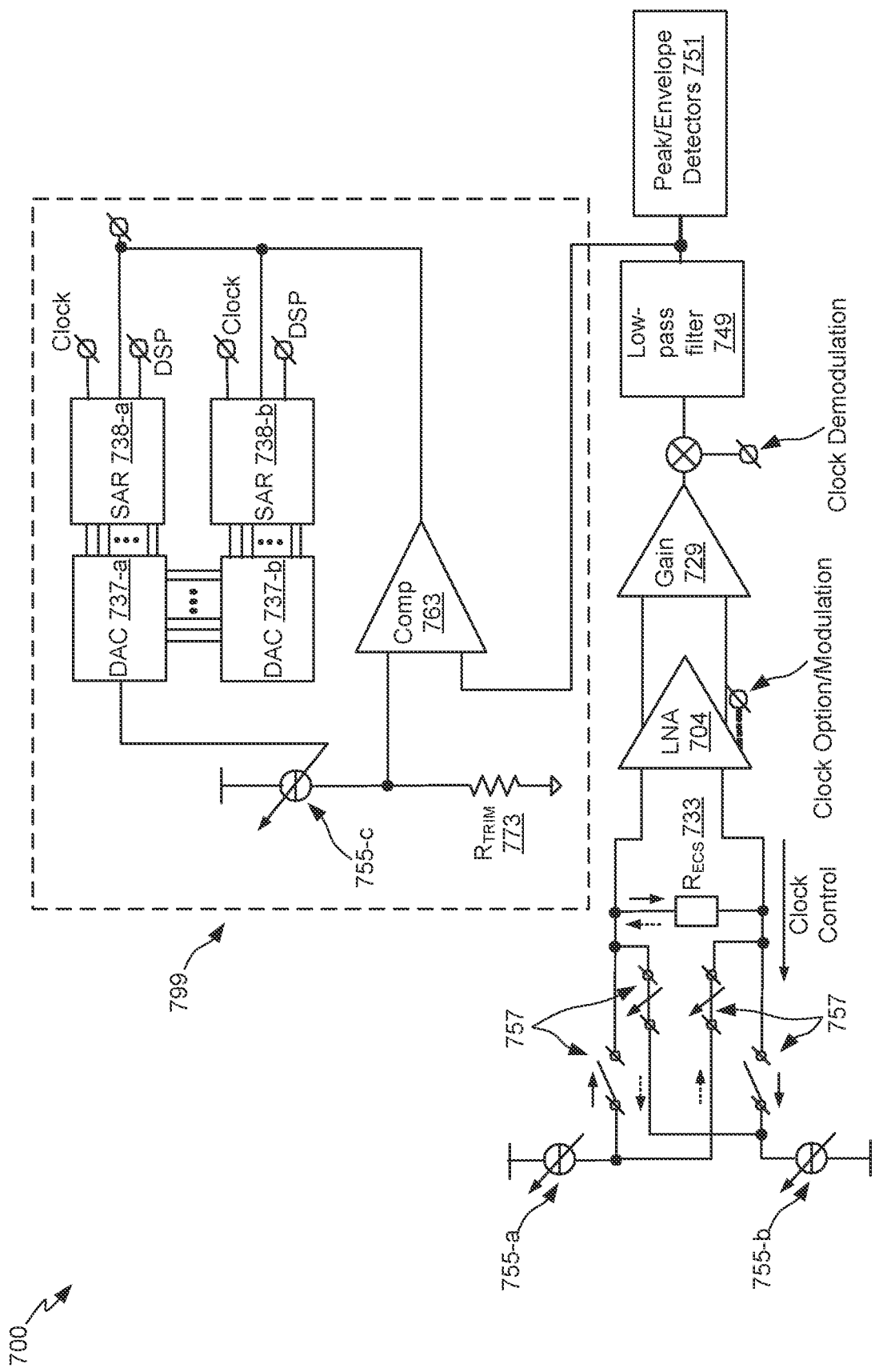
FIG. 7 illustrates a schematic diagram of an alternating-bias signal resistance detection circuit supporting dual mode and dual path monitoring, in accordance with various aspects of the disclosure.

Turning now to FIG. 7, which illustrates a schematic diagram 700 of an alternating-bias signal resistance detection circuit supporting dual mode and dual path monitoring, in accordance with various aspects of the disclosure. In some embodiments, continuous dual mode monitoring may be implemented using one or more of an alternating bias (chop) and modulation. As previously noted, the modulation helps remove 1/f noise sources from the bias and the amplifier (e.g., LNA 704, gain 729), as compared to the prior art. In some cases, an alternating-bias signal (e.g., AC bias pulse) may be generated using a plurality of controlled current sources (e.g., controlled current sources 755-*a*, 755-*b*) and a plurality of switches 757, where the switches 757 may be arranged in an H-bridge. Other types of switch arrangements besides H-bridge are contemplated in different embodiments and the illustration in FIG. 7 is not intended to be limiting.

In some cases, the switches 757 may be controlled (e.g., at a first clock frequency ($f_c$)) for AC biasing of the $R_{ECS}$ 733. In other cases, the switches 757 may be controlled such that a signal frequency of the alternating input bias is the first clock frequency ($f_c$). Further, the AC bias biases the $R_{ECS}$, i.e., imposes a bias voltage (e.g., shown as $V_{BIAS}$ 435 in FIG. 4) across the resistor. As seen, the $R_{ECS}$ 733 is electrically coupled to an LNA 704, which amplifies the biasing voltage across the $R_{ECS}$ 733. In some embodiments, the LNA 704 is electrically coupled to another amplifier (e.g., shown as gain 729). In accordance with aspects of the present disclosure, an alternating-bias (or chopping) may be added at the input of the LNA 704 to modulate the ECS signal to a sufficiently high frequency such that the 1/f noise (e.g., from bias and/or the amplifier) is significantly reduced. For example, alternating bias/chopping may be added using the "clock control", as shown in FIG. 7. Additionally, the LNA 704 is referenced to the operating frequency ($f_c$) of the clock control, shown by the "clock option" in FIG. 7. In some aspects, the LNA 704, gain 729, and low-pass filter 749 in FIG. 7 serve as a lock-in amplifier by allowing a signal (e.g., ECS signal) with a known carrier wave (e.g., carrier or clock frequency, $f_c$) to be extracted from a high noise environment.

In some cases, the input signal at the LNA 704 is modulated using the first clock frequency (e.g., at least 400 kHz, at least 500 kHz, at least 1 MHz, etc.). Then, the modulated ECS signal is amplified again (e.g., by the gain 729), following which it is demodulated using the first carrier or clock frequency, $f_c$. In other words, the signal at the output of the gain 729 is demodulated using the same signal frequency as the alternating input bias (i.e., AC biasing signal or alternating-bias signal used to bias the slider/$R_{ECS}$ 733). Following demodulation of the signal (i.e., the amplified modulated ECS signal), the demodulated signal is passed through a low-pass filter 749 coupled at the output of the gain 729. After the low-pass filter or LPF 749, the demodulated and filtered ECS signal goes to the peak/envelope detector 751 and/or the resistance detection circuit 799. As seen, the resistance detection circuit 799 comprises a comparator 763, a trimming resistor ($R_{TRIM}$ 773), a controlled current source 755-*c*, and one or more DACs 737 and SARs 738. The DACs 737-*a*, 737-*b* and SARs 738-*a*, 738-*b* may be similar or substantially similar to the DACs 437 and SARs 438 previously discussed in relation to FIG. 4. The trimming resistor 773 assists in resistance measurements, for example, when the reference current is trimmed for accuracy of voltage measurements, and where the voltage measurements are taken across trimming resistor 773. In one non-limiting example, the DAC 737-*a* may be used in conjunction with the SAR 738-*a* to determine the resistance value of the $R_{ECS}$ 733. Further, the DAC 737-*b* and SAR 738-*b* may be used to determine the delta/change in the resistance value (Δ$R_{ECS}$).

Figure 8B:
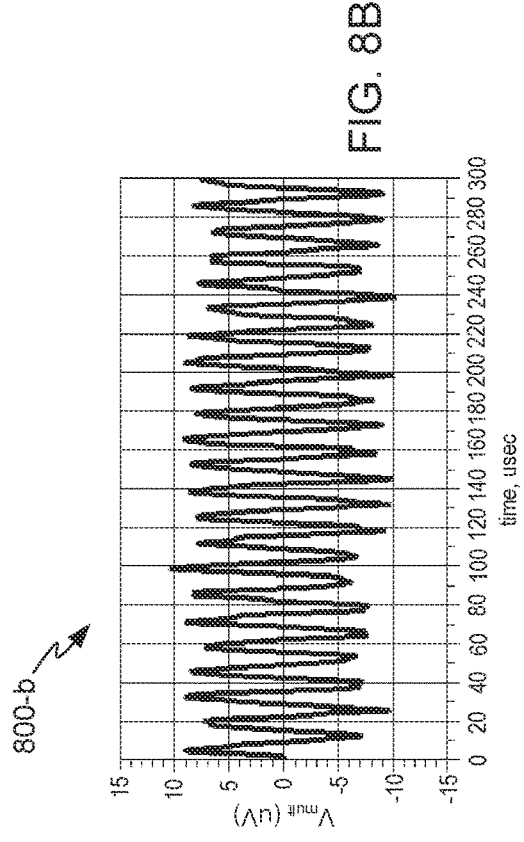
FIG. 8B illustrates an example graph of the demodulated high-frequency (HF) signal extracted from the graph in FIG. 8A, according to various aspects of the disclosure.
Figure 8C:
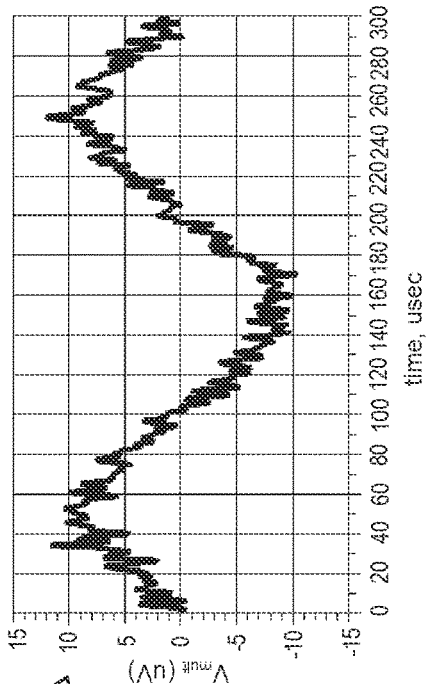
FIG. 8C illustrates an example graph of the demodulated low-frequency (LF) signal extracted from the graph in FIG. 8A, according to various aspects of the disclosure
Figure 8A:
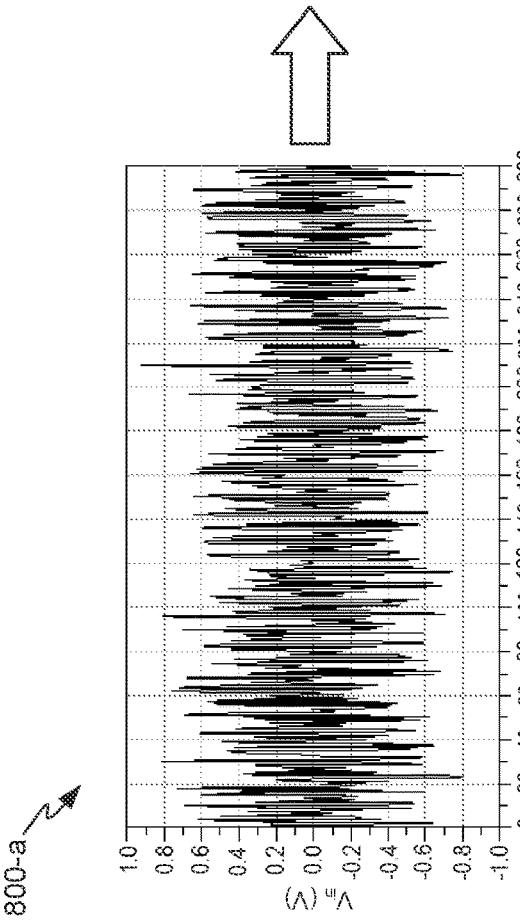
FIG. 8A illustrates an example graph of an input voltage signal ($V_{in}$) against time at the input of the low noise amplifier (LNA) in FIG. 7, where the input voltage signal comprises both high and low-frequency components, as well as noise, according to various aspects of the disclosure.

FIG. 8A shows an example of a graph 800-*a* of an input voltage signal ($V_{in}$) against time at the input of the preamplifier (e.g., LNA 704) in FIG. 7, where the input voltage signal comprises both high and low-frequency components, as well as noise. It should be noted that the signal+noise measurements depicted in FIG. 8A may be generated by injecting an alternating-bias signal (or AC bias) into the slider/$R_{ECS}$, as described above in relation to FIG. 7. In some cases, the noise may include alternating-bias noise, signal noise, and/or 1/f noise from bias, to name a few non-limiting examples. In accordance with aspects of the disclosure, modulation of the signal+noise may help remove the noise component of the waveform in graph 800-*a*. Furthermore, the demodulated low and high frequency signal components may be extracted for monitoring/detecting $R_{ECS}$ and Δ$R_{ECS}$, and/or for defect scanning during HDD manufacturing.

FIG. 8B shows an example graph 800-*b* of a demodulated HF signal extracted from the graph in FIG. 8A, according to various aspects of the disclosure.

FIG. 8C shows an example graph 800-*c* of a demodulated LF or DC signal extracted from the graph in FIG. 8A, according to various aspects of the disclosure.

Figure 8D:
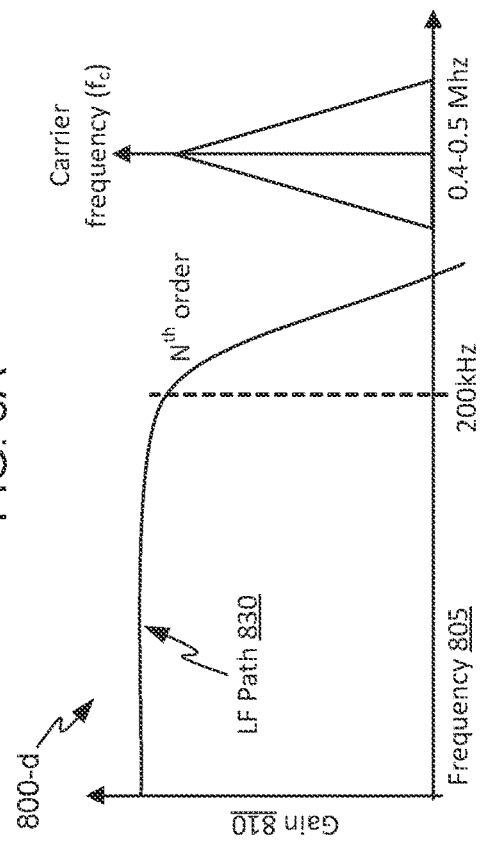
FIG. 8D illustrates an example graph showing the gain of the LF path with respect to frequency, in accordance with aspects of the present disclosure.

FIG. 8D illustrates an example graph 800-*d* showing the gain 810 for a LF path 830 against frequency 805, in accordance with aspects of the present disclosure. Here, the input signal at the LNA 704 has been modulated using a first carrier frequency, $f_c$, (e.g., ~400-500 KHz or 0.4-0.5 MHz) and shifted up in the frequency domain. After signal amplification (i.e., by the LNA 704 and/or the gain 729), the signal corresponding to the LF path is demodulated by the same carrier frequency ($f_c$). In other words, the signal at the output of the AC gain 729 in FIG. 7 is demodulated using the same signal frequency as the alternating input bias and/or the modulation frequency. Following demodulation, the demodulated signal is passed through a low-pass filter 749 to extract the low-frequency ECS signal (which may correspond to a low-frequency resistance detection signal). FIG. 8D also depicts the $N^{th}$ order cut-off frequency of the low-pass filter 749. As noted above, in some embodiments, the $N^{th}$ order cut-off frequency of the low-pass filter 749 may be selected based on the clock/carrier frequency used for modulation/demodulation. In this example, the ECS signal has been shifted to ~400-500 KHz and the $N^{th}$ order cut-off frequency of the low-pass filter is 200 kHz (e.g., <½ of the clock frequency to prevent aliasing issues). It should be noted that, the clock frequency used for the modulation/demodulation/alternating input bias and the low-pass filter cut-off frequency discussed herein are exemplary only and not intended to be limiting. Other ranges of frequencies for the alternating bias (or chopping) and the LPF cut-off are contemplated in different embodiments. In some circumstances, the chopping bias may serve to remove the 1/f noise corresponding to the alternating input bias. The chopping bias may be implemented by way of the clock option/modulation (i.e., chopping) at the input of the LNA 704.

Figure 9:
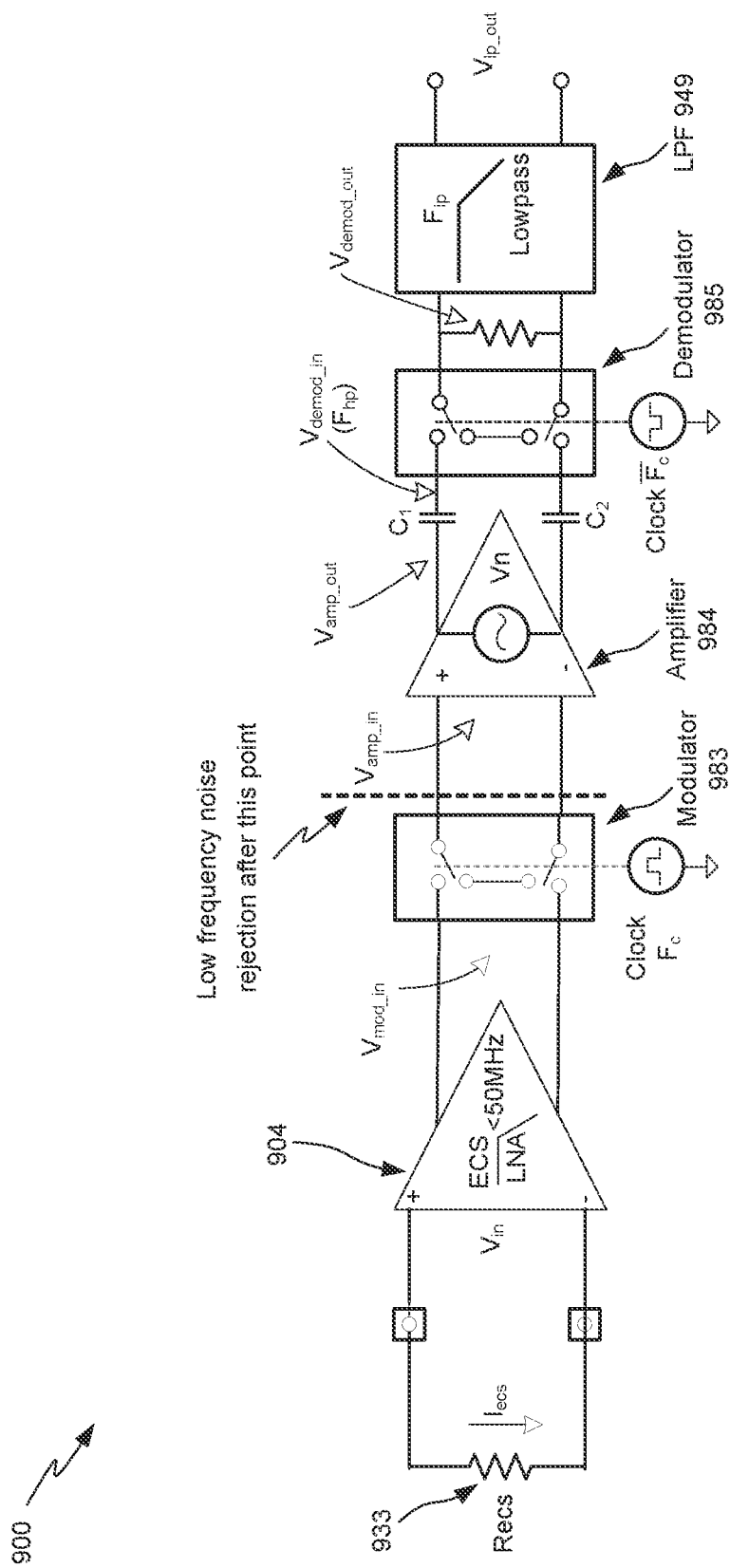
FIG. 9 illustrates a schematic diagram of a chopping amplifier circuit coupled at an output of an LNA, according to various aspects of the present disclosure.

FIG. 9 illustrates a schematic diagram 900 of a chopping amplifier circuit coupled at an output of the preamplifier (ECS LNA 904), which allows $V_{in}$ to be extracted for dual path monitoring, according to various aspects of the present disclosure. FIG. 9 depicts an embedded contact sensor (ECS) resistance, $R_{ECS}$ 933, electrically coupled at an input of the ECS LNA 904. The input voltage to the ECS LNA 904 is depicted as $V_{IN}$, where the input voltage is a function of $R_{ECS}$ and the current, $I_{ECS}$, flowing through $R_{ECS}$. For instance, $V_{in} = R_{ECS} \times I_{ECS}$. An input modulator 983 is coupled at the output of the LNA, where the input modulator 983 is configured to modulate the voltage signal ($V_{mod\_in}$) at the output of the LNA by a clock frequency ($F_c$). In some examples, the modulated signal is amplified using another amplifier 984 (similar to gain 729 in FIG. 7), where the input voltage to the amplifier 984 is shown as $V_{amp\_in}$. The 1/f noise or drift noise of the amplifier is shown as $V_n$. A high pass filter (e.g., implemented using capacitors $C_1$ and $C_2$) at the amplifier 984 output may be used to remove the amplifier noise "Vn". As seen, the amplified voltage, $V_{amp\_out}$, at the output of the amplifier is passed through a high pass filter and demodulated by the clock frequency ($f_c$). The output voltage at the demodulator 985 is shown as $V_{demod\_out}$. This demodulated voltage signal, $V_{demod\_out}$, is filtered by the low-pass filter 949 ($F_{lp}$), and the output voltage of the LPF 949 is shown as $V_{lp\_out}$. Thus, the LPF output voltage corresponds to the input voltage ($V_{in}$) with the unwanted 1/f noise or amplifier drift noise removed. As noted in FIG. 9, in some circumstances, any low frequency signal or noise before the input modulator 983 may not be rejected by the chopping amplifier. In other words, the circuit shown in FIG. 9 is configured to only reject low frequency signals/noise after the input modulator 983 and before the amplifier 984. In contrast, aspects of the present disclosure facilitate in reducing or removing low frequency noise (e.g., 1/f noise due to the alternating-bias) by modulating the ECS signal at the input of the LNA.

Figure 10:
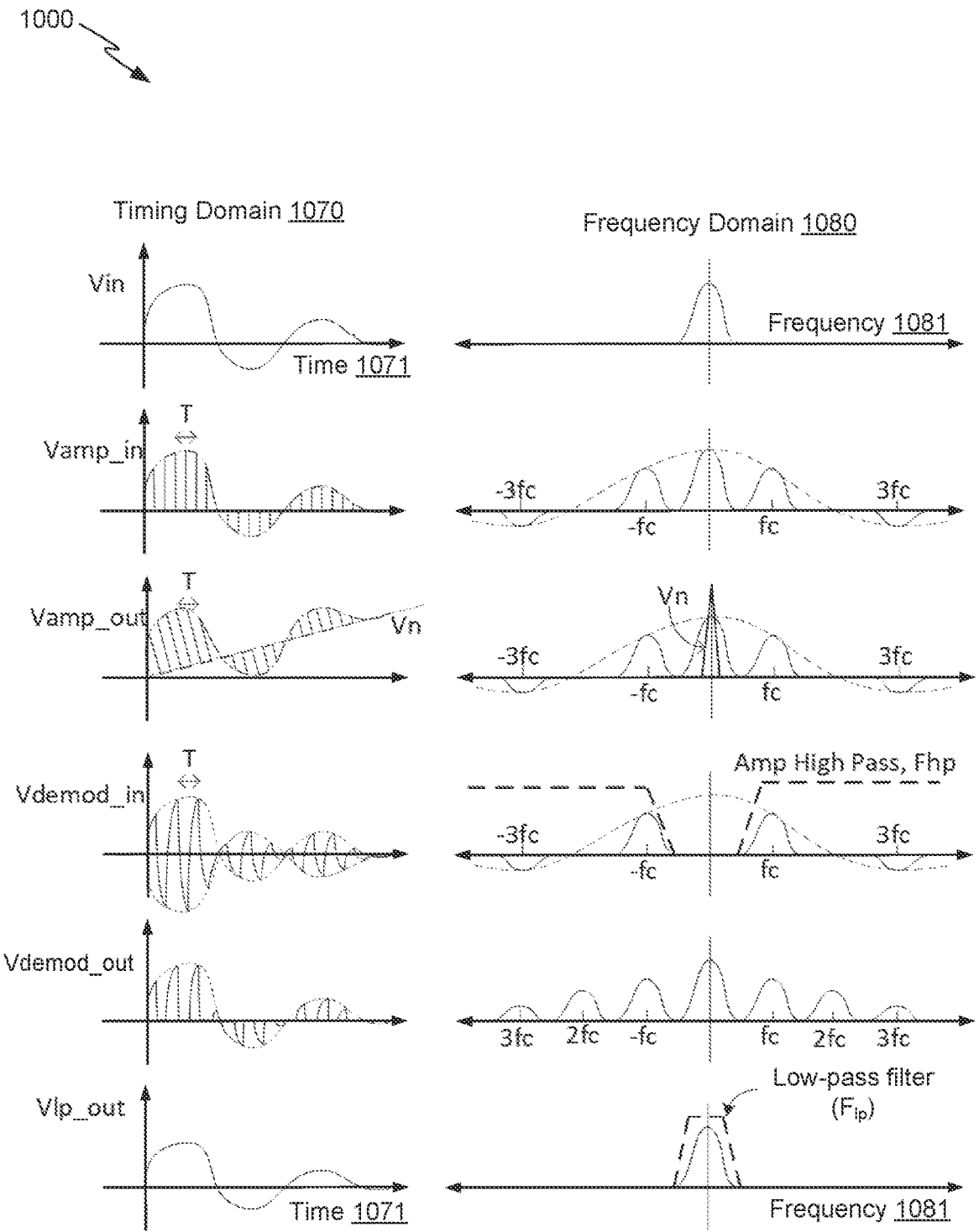
FIG. 10 illustrates example time and frequency domain graphs of various voltage signals described in FIG. 9, in accordance with aspects of the present disclosure.

FIG. 10 illustrates example graphs 1000 of various voltage signals described in FIG. 9 in both the timing domain 1070 and the frequency domain 1080, in accordance with aspects of the present disclosure. As seen, FIG. 10 depicts the input voltage ($V_{in}$) to the ECS LNA 904, the amplifier input and output voltages, $V_{amp\_in}$ and $V_{amp\_out}$, the input and output voltages $V_{demod\_in}$ and $V_{demod\_out}$ of the demodulation circuit 985, and the output voltage ($V_{lp\_out}$) of the low-pass filter 949 in relation to time 1071 and frequency 1081. As noted above, prior to demodulation, the input voltage ($V_{demod\_in}$) to the demodulator 985 may be passed through a high pass filter ($F_{hp}$) to remove the 1/f noise or amplifier drift noise from the amplifier 984 output. As seen in the timing 1070 and frequency domain 1080 plots for $V_{amp\_out}$ and $V_{demod\_in}$, the 1/f noise ($V_n$) has been removed as a result of passing the amplifier 984 output through the high pass filter.

Thus, broadly, aspects of the disclosure are directed to an alternating-bias resistance detection for RTD transducers (e.g., ECS, NTS transducers). The disclosed architecture adds alternating-bias (or chopping) at the input of an amplifier (e.g., LNA) that receives the ECS signal output. In some cases, the ECS LNA may utilize common-gate and AC coupling at its input (i.e., no DC feedback may be required). In some embodiments, an accurate bias current (or alternatively, feedforward on resistance value) may be utilized to mimic voltage biasing of the slider/$R_{ECS}$. In some embodiments, the switches may be implemented as shown in FIG. 7, or alternatively, in an H-bridge configuration. Further, the alternating-bias may be differential with a common-mode control (e.g., interface voltage control or IVC). It should be noted that, the techniques described herein may also be implemented in existing resistance detection circuits (e.g., shown in FIG. 4) for ECS/NTS transducers. In one non-limiting example, a pulsing bias and/or a DC bias may be added to the ECS LNA bias. Other techniques for integrating aspects of the present disclosure in existing resistance detection topologies are contemplated in different embodiments, and the examples listed herein are not intended to be limiting. Thus, in some aspects, the present disclosure facilitates in supporting continuous dual modes, AC and DC, operation. In some examples, the AC mode may primarily be utilized for defect scanning during HDD manufacturing, while the DC mode may be used for monitoring the ECS resistance and/or AR of the ECS resistance. In some instances, dual path monitoring of the AC and DC paths may serve to reduce the testing time in the HDD manufacturing phase, since defect scanning can potentially be pushed to having infield background scanning.

Lastly, while the present disclosure is generally described in relation to ECS transducers, this is in no way intended to be limiting. The same or similar principles disclosed herein may be used for other types of RTD transducers known and contemplated in the art, such as, but not limited to, NTS transducers.

Any suitable control circuitry may be employed to implement the flow diagrams in the above examples, such as any suitable integrated circuit or circuits. For example, the control circuitry 22 may be implemented within a read channel integrated circuit (read IC), or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (e.g., SoC 101 in FIG. 1B). In addition, the control circuitry 22 may include a preamp circuit implemented as a separate integrated circuit, integrated into the read channel or data storage controller circuit, or integrated into an SoC.

In some examples, the control circuitry, such as control circuitry 22, comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry (e.g., control circuitry 22) comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry 22 as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub combinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for alternating-bias signal resistance detection for ECS and/or NTS transducers for data storage, and other aspects of this disclosure. Persons skilled in the relevant fields of art will be well-equipped by this disclosure with an understanding and an informed reduction to practice of a wide panoply of further applications, architectures, techniques, and methods for alternating-bias signal resistance detection for ECS and/or NTS transducers for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
   a slider with a resistive temperature detector (RTD), the RTD comprising a first resistance electrically connected to a first amplifier circuit; and
   one or more processing devices configured to:
      generate an alternating-bias signal for biasing the first resistance of the resistive temperature detector (RTD) of the slider, wherein the alternating-bias signal generates a voltage bias across the first resistance;
      generate a resistance detection signal; and
      process the resistance detection signal to determine a change in a resistance value of the first resistance.

2. The data storage device of claim 1, wherein the alternating-bias signal has a first clock frequency and wherein the one or more processing devices configured to generate a resistance detection signal further comprises:
   a modulator for modulating an input signal of the first amplifier circuit; and
   a demodulator at an output of a second amplifier circuit, for demodulating an amplified modulated signal using the first clock frequency to generate a demodulated signal.

3. The data storage device of claim 2, further comprising a low-pass filter coupled at the output of the second amplifier circuit, wherein the low-pass filter filters the demodulated signal to generate the resistance detection signal.

4. The data storage device of claim 2, wherein the first clock frequency is at least 400 kHz, at least 500 kHz, at least 1 MHZ, or at least 5 MHZ, and wherein a cut-off frequency of a low-pass filter coupled at the output of the second amplifier circuit is based at least in part on the first clock frequency, and wherein the cut-off frequency of the low-pass filter is at least 200 kHz.

5. The data storage device of claim 2, wherein the second amplifier circuit comprises an AC gain.

6. The data storage device of claim 1, wherein the one or more processing devices are further configured to:
   process the resistance detection signal in a high frequency (HF) mode and a low frequency (LF) mode, wherein processing the resistance detection signal in the HF mode comprises detecting one or more signal spikes in a HF response of the resistance detection signal for defect scanning of one or more disks of the data storage device,
   wherein processing the resistance detection signal in the LF mode comprises monitoring one or more of the first resistance and the change in the resistance value of the first resistance for determining a fly-height of the slider in real-time or substantially real-time.

7. The data storage device of claim 1, further comprising:
   a plurality of controlled current sources; and
   a plurality of switches, wherein each of the plurality of switches is electrically connected to the first resistance and to at least one controlled current source of the plurality of controlled current sources;
   wherein the one or more processing devices are further configured to control the plurality of switches in order to generate the alternating-bias signal, the alternating-bias signal comprising an alternating-bias current, and wherein the alternating-bias current flows through the first resistance of the RTD to generate the voltage bias.

8. The data storage device of claim 1, wherein the first amplifier circuit comprises a low-noise amplifier (LNA), and wherein the LNA utilizes common-gate and alternating current (AC) coupling at its input.

9. The data storage device of claim 1, wherein the alternating-bias signal is differential with a common-mode control (IVC).

10. The data storage device of claim 1, wherein the RTD comprises one of an embedded contact sensor (ECS) and a nearfield temperature sensor (NTS).

11. A method for operating a data storage device comprising:
   generating an alternating-bias signal for biasing a first resistance of a resistive temperature detector (RTD) of a slider, wherein the alternating-bias signal generates a voltage bias across the first resistance, and wherein the alternating-bias signal has a first clock frequency;
   generating a resistance detection signal; and
   processing the resistance detection signal to determine a change in a resistance value of the first resistance.

12. The method of claim 11, further comprising:
   modulating, using the first clock frequency, an input signal of a first amplifier circuit to generate a modulated signal, wherein the input signal corresponds to the voltage bias; and
   demodulating, at an output of a second amplifier circuit, an amplified modulated signal using the first clock frequency to generate a resistance detection signal, wherein the second amplifier circuit is electrically coupled to the first amplifier circuit and configured to amplify the modulated signal.

13. The method of claim 11, further comprising processing the resistance detection signal in a high frequency (HF) mode and a low frequency (LF) mode, wherein:
   processing the resistance detection signal in the HF mode comprises detecting one or more signal spikes in a HF response of the resistance detection signal, and
   processing the resistance detection signal in the LF mode comprises monitoring one or more of the first resistance and the change in the resistance value of the first resistance for determining a fly-height of a slider in real-time or substantially real-time.

14. The method of claim 13, wherein generating the alternating-bias signal comprises using a plurality of controlled current sources and a plurality of switches.

* * * * *